United States Patent
Fujii

(10) Patent No.: US 9,363,345 B2
(45) Date of Patent: Jun. 7, 2016

(54) COVER FOR MOBILE ELECTRONIC DEVICE, AND MOBILE ELECTRONIC APPARATUS EMPLOYING SAME

(71) Applicant: KYOCERA Corporation, Kyoto-shi, Kyoto (JP)

(72) Inventor: Yasuhito Fujii, Kirishima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/402,168

(22) PCT Filed: May 28, 2013

(86) PCT No.: PCT/JP2013/064759
§ 371 (c)(1),
(2) Date: Nov. 19, 2014

(87) PCT Pub. No.: WO2013/180123
PCT Pub. Date: Dec. 5, 2013

(65) Prior Publication Data
US 2015/0111618 A1    Apr. 23, 2015

(30) Foreign Application Priority Data

May 28, 2012 (JP) ................. 2012-120975

(51) Int. Cl.
| H04M 1/00 | (2006.01) |
|---|---|
| H04M 1/11 | (2006.01) |
| A45C 11/00 | (2006.01) |
| H04M 1/725 | (2006.01) |
| H04M 1/02 | (2006.01) |
| H04M 1/18 | (2006.01) |

(52) U.S. Cl.
CPC ............. *H04M 1/11* (2013.01); *A45C 11/00* (2013.01); *H04M 1/72575* (2013.01); *A45C 2011/001* (2013.01); *A45C 2011/002* (2013.01); *A45C2011/003* (2013.01); *H04M 1/0283* (2013.01); *H04M 1/185* (2013.01)

(58) Field of Classification Search
CPC ............ H04M 19/047; H04M 1/0283; H04M 1/0249; H04M 1/026; H04M 1/72575
USPC ............... 455/567, 575.1, 575.8, 90.3, 550.1, 455/403, 422.1, 73, 347; 379/440, 428.01, 379/451, 452, 455; 340/407.2
See application file for complete search history.

(56) References Cited

U.S. PATENT DOCUMENTS

| 2006/0003709 A1* | 1/2006 | Wood ................... | H04B 1/3888 455/90.3 |
|---|---|---|---|
| 2009/0051509 A1* | 2/2009 | Hwang ................ | H04B 1/3888 340/407.2 |

FOREIGN PATENT DOCUMENTS

| JP | 2002-280753 A | 9/2002 |
|---|---|---|
| JP | 2007-330560 A | 12/2007 |
| JP | 2013-128896 A | 7/2013 |

OTHER PUBLICATIONS

International Search Report (Form PCT/ISA/210) dated Jul. 30, 2013 issued for PCT/JP2013/064759.

*Primary Examiner* — Keith Ferguson
(74) *Attorney, Agent, or Firm* — Volpe and Koenig, P.C.

(57) ABSTRACT

The cover for a mobile electronic device includes at least: a cover body formed of an elastic body capable of transmitting vibration, and attached to a mobile electronic device with a plurality of surfaces, so as to at least partially cover two or more of the plurality of surfaces; a vibrating element that is attached to the cover body and that vibrates the cover body by vibration thereof upon receiving an electrical signal; and a connector that is used to connect the vibrating element to the mobile electronic device such that transmission of an electrical signal is possible, and the mobile electronic device employing the same are provided.

18 Claims, 8 Drawing Sheets

COVER FOR MOBILE ELECTRONIC DEVICE, AND MOBILE ELECTRONIC APPARATUS EMPLOYING SAME

TECHNICAL FIELD

The present invention relates to a cover for a mobile electronic device and a mobile electronic apparatus employing the same.

BACKGROUND ART

In the related art, there is known a cover for a mobile electronic device which protects a mobile electronic device by covering the surface of a mobile electronic device (for example, refer to PTL 1).

CITATION LIST

Patent Literature

PTL 1: Japanese Unexamined Patent Application Publication No. 2002-280753

SUMMARY OF INVENTION

Technical Problem

However, the cover for a mobile electronic device of the relates art as described above was for protecting a mobile electronic device by covering the surface of a mobile electronic device and preventing the breakage of a mobile electronic device or the like, but hardly had other functions.

The present invention has been made in consideration of the above-described problems described to be devised and an object thereof is to provide a cover for a mobile electronic device capable of transmitting information such as voice information by vibration in response to a signal input from a mobile electronic device and a mobile electronic apparatus employing the same.

Solution to Problem

A cover for a mobile electronic device of the present invention includes a cover body that includes at least a part formed of an elastic body capable of transmitting vibration, that is attached to a mobile electronic device with a plurality of surfaces and that at least partially covers two or more of the plurality of surfaces, a vibrating element that is attached to the cover body and that vibrates the cover body by vibration thereof upon receiving an electrical signal, and a connector that is connected to the mobile electronic device so as to transmit the electrical signal to the vibrating element.

A mobile electronic apparatus of the present invention includes the cover for a mobile electronic device and the mobile electronic device to which the cover for a mobile electronic device is attached.

Advantageous Effects of Invention

According to the cover for a mobile electronic device of the present invention, a cover for a mobile electronic device capable of transmitting information such as voice information by vibration in response to a signal input from a mobile electronic device can be obtained.

According to the mobile electronic apparatus of the present invention, a mobile electronic device in which the breakage of a mobile electronic device is reduced and which is capable of transmitting information such as voice information using vibration can be obtained.

DESCRIPTION OF EMBODIMENTS

Hereinafter, a detailed description will be given of a cover for a mobile electronic device of the present invention and a mobile electronic apparatus employing the same with reference to attached drawings.

Figure 1:
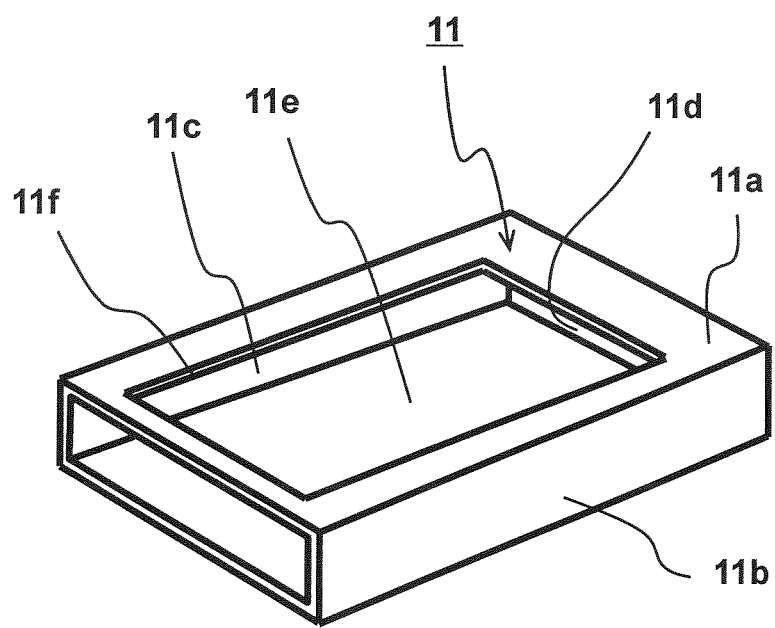
FIG. 1 is a perspective view schematically showing a cover for a mobile electronic device of an example of an embodiment of the present invention.
Figure 1:
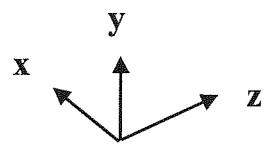
Figure 2:
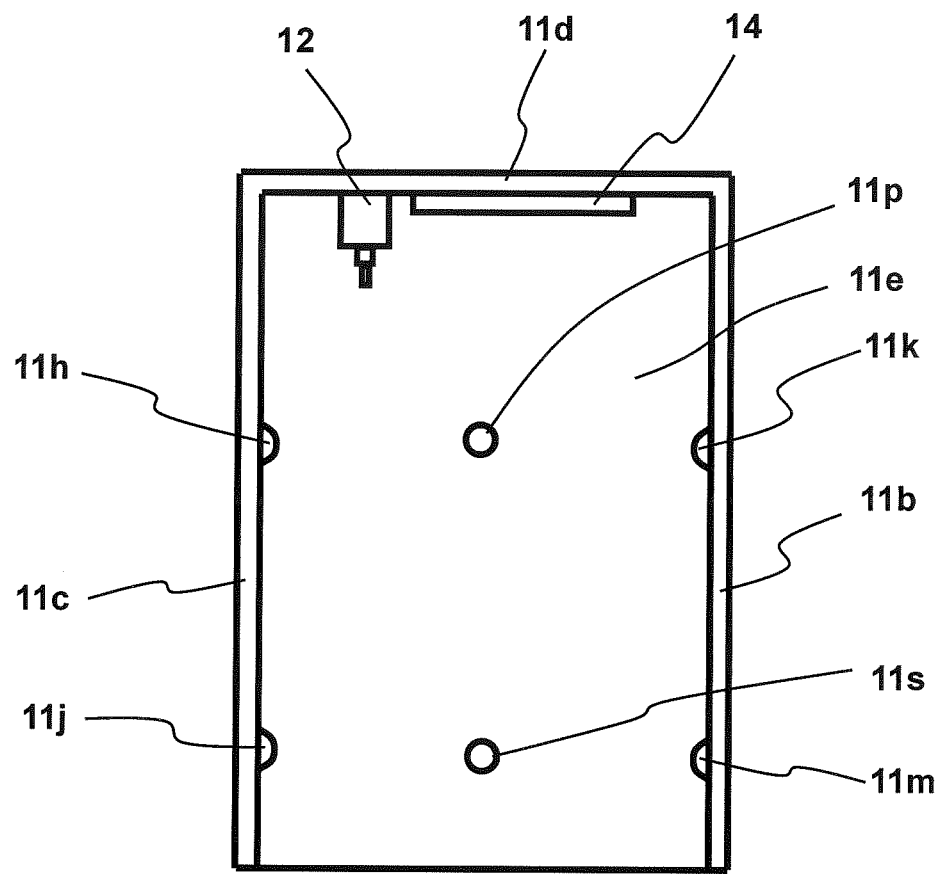
FIG. 2 is a plan view schematically showing a cover for a mobile electronic device shown in FIG. 1.

FIG. 1 is a perspective view schematically showing a cover for a mobile electronic device of an example of an embodiment of the present invention. FIG. 2 is a plan view schematically showing a cover for a mobile electronic device shown in FIG. 1. Moreover, in order to make a structure easier to understand, a state in which a first portion 11$a$ of a cover body 11 is seen through is shown in FIG. 2. In addition, an illustration of a detailed structure of a vibrating element 14 is omitted in FIG. 2. The cover for a mobile electronic device of this example is provided with the cover body 11, the vibrating element 14, a connector 12, and spacers 11$h$, 11$j$, 11$k$, 11$m$, 11$p$, and 11$s$.

The cover body 11 has a rectangular parallelepiped box-like shape in which one face is open and is configured of a first portion 11$a$, a second portion 11$b$, a third portion 11$c$, a fourth portion 11$d$, and a fifth portion 11$e$ which configure each rectangular parallelepiped face and are in a plate shape. In addition, a through hole 11$f$ in a rectangular shape is formed at the first portion 11$a$. Therefore, the first portion 11$a$ has a frame-like shape. At least a part of the cover body 11 is formed of an elastic body capable of transmitting vibration. Moreover, at least a part of the cover body 11, for example, a portion to which the vibrating element 14 is attached, a portion which is brought into contact with a human body, a portion connecting both portions, or the like, may be formed of an elastic body capable of transmitting vibration and other portions may be formed of one which is unable to transmit vibration. However, when the entire cover body 11 is formed of an elastic body capable of transmitting vibration, a region in which vibration can be transmitted to a human body is increased, which is therefore more desirable. Such the cover body 11 can be formed by using various kinds of well-known elastic materials and can be formed by suitably using a material such as, for example, a synthetic resin having large stiffness and elasticity, but may be formed by using other materials such as a metal. Moreover, the cover body 11 may at least partially cover two or more of a plurality of surfaces of the mobile electronic device to be attached and may be in another shape. For example, the cover body 11 in such a shape so as to at least partially cover the entire surfaces of the mobile electronic device may be used. In addition, in a case where the cover body 11 has such a shape so as to wholly cover two or more of a plurality of surfaces of the mobile electronic device, it is possible to enhance a function of protecting the mobile electronic device. In addition, in a case where the cover body 11 is in such a shape so as to wholly cover the surfaces other than two surfaces including one surface which is a face with the biggest area among a plurality of surfaces of the mobile electronic device, it is possible to further enhance a function of protecting the mobile electronic device.

The spacers 11h, 11j, 11k, 11m, 11p, and 11s are arranged on the surface of the inner side of the cover body 11 (the side at which the mobile electronic device is located when the cover body 11 is attached to the mobile electronic device). That is, the spacers 11h and 11j are arranged on the surface inside the third portion 11c, the spacers 11k and 11m are arranged on the surface inside the second portion 11b, and the spacers 11p and 11s are arranged inside the fifth portion 11e. The spacers 11h, 11j, 11k, 11m, 11p, and 11s respectively have a hemispherical shape and are integrally formed with the cover body 11 by using the same materials as that of the cover body 11. Moreover, the similar spacer is arranged on the surface inside the first portion 11a (not shown). When the cover body 11 is attached to the mobile electronic device, such a spacer has a function of forming a gap between the cover body 11 and the mobile electronic device. Moreover, since such a spacer may have the function of forming a gap between the cover body 11 and the mobile electronic device, it is possible to appropriately set a shape, the number, a position to be arranged, of the spacer, or the like. Moreover, the size of a gap formed between a portion to which the vibrating element 14 in the cover body is attached and the mobile electronic device needs to be larger than a dimension in which the amplitude of the bending vibration of the vibrating element and the cover body is added to the thickness of the vibrating element 14 and, for example, is set from approximately 0.5 mm to 3 mm. In addition, the size of a gap formed between the cover body 11 other than a portion to which the vibrating element 14 is attached and the mobile electronic device needs to be larger than the amplitude of the bending vibration of the cover body and, for example, is set from approximately 0.1 mm to 1 mm.

Figure 3:
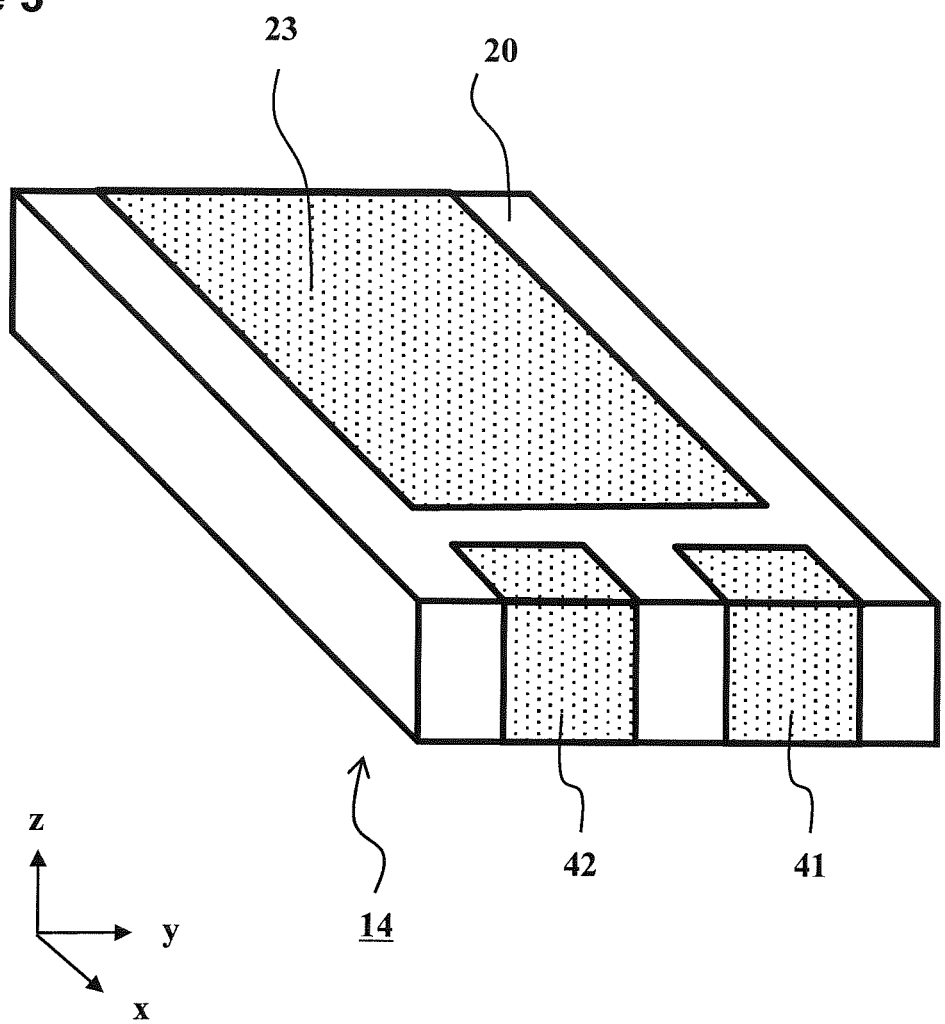
FIG. 3 is a perspective view schematically showing a vibrating element in a cover for a mobile electronic device shown in FIG. 1.
Figure 4A:
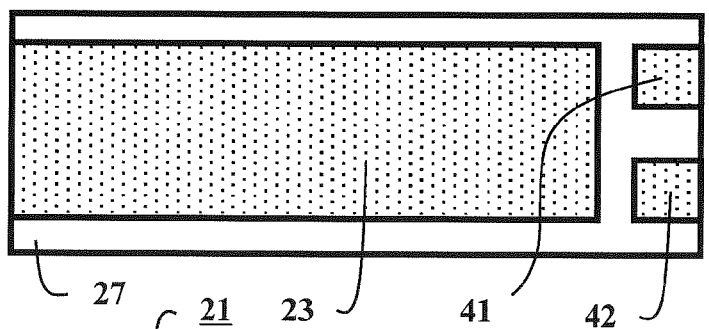
FIGS. 4($a$) to 4($e$) are plans views for illustrating a structure of a vibrating element shown in FIG. 3.
Figure 4B:
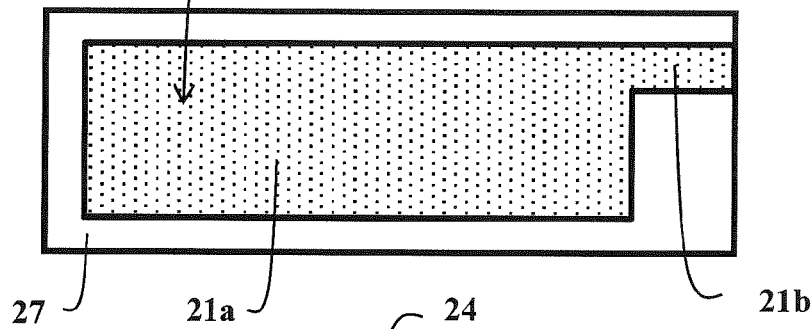
Figure 4C:
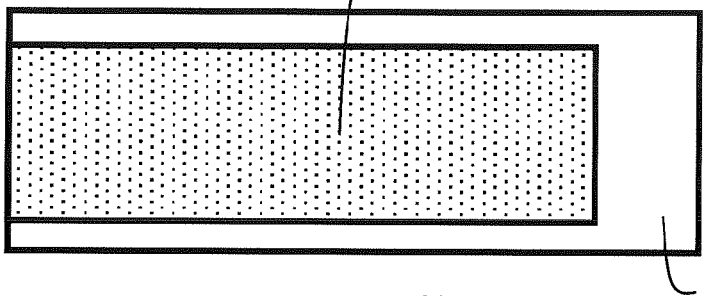
Figure 4D:
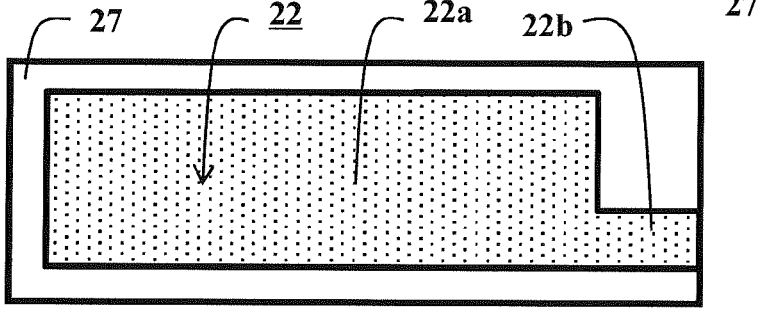
Figure 4E:
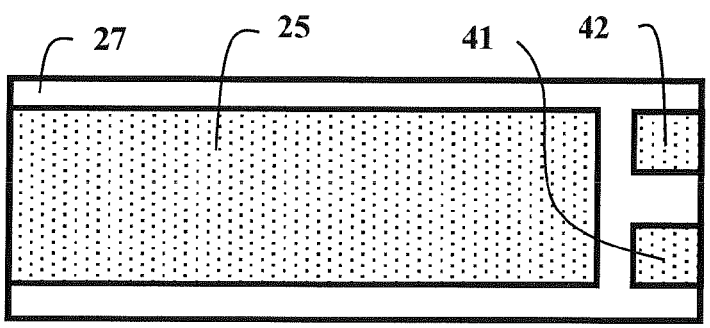
Figure 5:
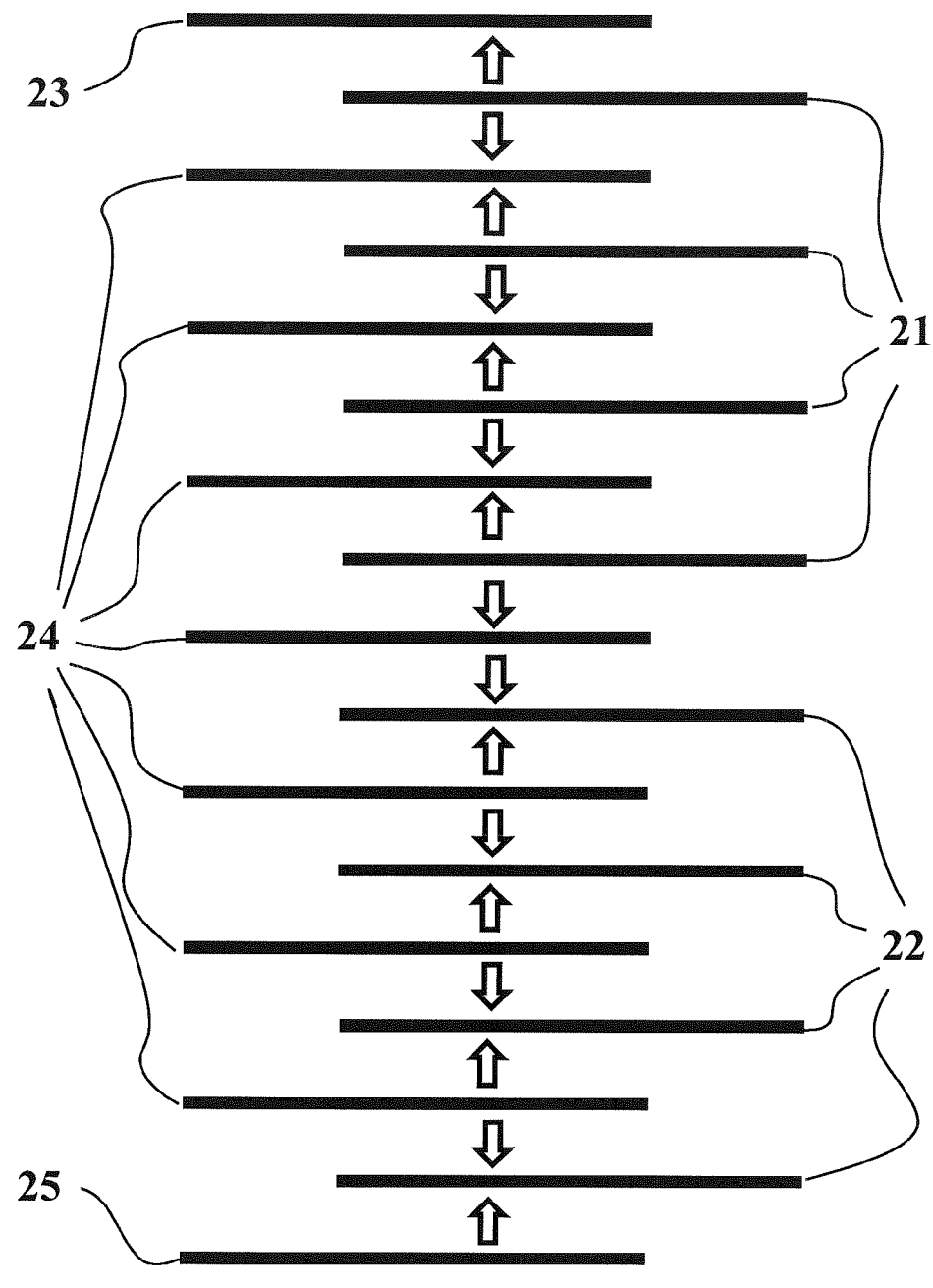
FIG. 5 is a view for illustrating a structure of a vibrating element shown in FIG. 3.

In addition, the vibrating element 14 is attached onto the surface inside the fourth portion 11d of the cover body 11. The vibrating element 14 is a piezoelectric vibrating element configured of a piezoelectric body with a bimorph structure (a piezoelectric bimorph element). FIG. 3 is a perspective view schematically showing a vibrating element 14. FIGS. 4(a) to 4(e) are plans views schematically showing the shapes of electrodes 21 to 25 in which a vibrating element 14 has. FIG. 5 is a view schematically showing a positional relation of electrodes 21 to 25 in a z-axis direction and a polarization state of a piezoelectric body layer 27 arranged between electrodes 21 to 25. Moreover, FIGS. 4(a) to 4(d) show states viewed from a +z direction side and FIG. 4(e) shows a state viewed from a z direction side. In addition, in FIG. 5, an illustration of a laminate 20, a first to a third terminal electrodes, and the piezoelectric body layer 27 is omitted.

The vibrating element 14 includes the laminate 20, the first terminal electrode 41, the second terminal electrode 42, and the third terminal electrode (not shown). On the end face of a +x direction side of the laminate 20, the first terminal electrode 41 and the second terminal electrode 42 are arranged so as to straddle over the both end faces in a z-axis direction. In addition, the third terminal electrode (not shown) is arranged on the end face of an x direction side of the laminate 20.

The laminate 20 is configured by alternatively arranging the piezoelectric body layer 27 including a plurality of layers which are polarized in a z-axis direction and a plurality of electrodes 21 to 25 with a flat shape along a z-axis direction. The electrode 23 is arranged on the surface of a +z direction side of the laminate 20. The electrode 25 is arranged on the surface of a z direction side of the laminate 20. A plurality of electrodes 21, electrodes 22, and electrodes 24 are respectively arranged inside the laminate 20. Then, the electrode 21 or the electrode 22 and the electrode 23, the electrode 24, or the electrode 25 are alternatively arranged in a z-axis direction. In addition, the electrode 23 or the electrode 24 and the electrode 21 are alternatively arranged in a +z direction side and the electrode 24 or the electrode 25 and the electrode 22 are alternatively arranged in a z direction side.

The electrode 21 has a structure in which one end of a drawer part 21b in a rectangular shape is connected to one end of a main body part 21a in a rectangular shape formed at intervals apart from the side surface of the laminate 20. The other end of the drawer part 21b is connected to the first terminal electrode 41. The electrode 22 has a structure in which one end of a drawer part 22b in a rectangular shape is connected to one end of a main body part 22a in a rectangular shape formed at intervals apart from the side surface of the laminate 20. The other end of the drawer part 22b is connected to the second terminal electrode 42. The electrodes 23, 24, and 25 respectively have a shape in which only one end in a length direction is exposed on the side surface of the laminate 20 and which is a rectangular shape. Then, one ends of the electrodes 23, 24, and 25 in each length direction are connected to the third terminal electrode (not shown).

In addition, the piezoelectric body layer 27 arranged between the electrodes 21 to 25 is polarized in a direction indicated by an arrow in FIG. 5. That is, the piezoelectric body layer 27 is polarized in a direction from the electrode 21 toward the electrodes 23 and 24 at a +z direction side and is polarized in a direction from the electrodes 24 and 25 toward the electrode 22 at a z direction side. Then, when the vibrating element 14 is vibrated, for example, an AC voltage is applied so that the electrodes 21 and 22 reach the same potential, the electrodes 23, 24, and 25 reach the same potential and the potential difference is generated between the electrodes 21 and 22 and the electrodes 23, 24, and 25. Thereby, the vibrating element 14 is set so that the direction of polarization to the direction of an electric field applied in a certain moment is reversed between one side and the other side in a z-axis direction.

Therefore, the vibrating element 14 is set so that the z direction side is shrunk in an x-axis direction, when an electric signal is applied and the +z direction side is stretched in an x-axis direction in a certain moment. Thereby, the vibrating element 14 performs the bending vibration in a z-axis direction so that the amplitude is changed along an x-axis direction perpendicular to a z-axis direction when the electric signal is input. Then, the vibrating element 14 is attached to the cover body 11 to vibrate the cover body 11 by vibration thereof upon receiving an electrical signal.

In the vibrating element 14, the laminate 20, for example, can be set to have a length from approximately 18 mm to 28 mm, a width from approximately 1 mm to 6 mm, and a thickness from approximately 0.2 mm to 1.0 mm. In addition, the length of the electrodes 21 to 25 can be set to, for example, from approximately 17 mm to 25 mm and the width of the electrodes 21 to 25 can be set to, for example, from approximately 0.5 mm to 1.5 mm.

The piezoelectric body layer 27 configuring the laminate 20 can be formed by suitably using, for example, a non-lead-based piezoelectric body material such as lead titanate (PT), lead zirconate titanate (PZT), a Bi layered compound, or a compound with a tungsten bronze structure, or the like, however, other piezoelectric materials may be used. The thickness of one layer of the piezoelectric body layer 27 can be set, for example, from approximately 0.01 mm to 0.1 mm. The electrode 21, 22, and 24 can be formed, for example, by suitably using one containing a ceramic component or a glass component, in addition to a metal component such as silver or an alloy of silver and palladium, however, may be formed by using other well-known metal materials. It is desirable that the electrodes 23 and 25 and the first to the third terminal electrodes contain a metal component consisting of silver and a glass component, however, a metal other than silver may be contained.

It is possible to manufacture such a vibrating element 14 by, for example, the following method. Firstly, a binder, a dispersant, a plasticizer, and a solvent are added to a powder of the piezoelectric material, the mixture is stirred to produce a slurry, and the obtained slurry is molded into a sheet shape to produce a green sheet. Next, a conductor paste is printed on the green sheet to form an electrode pattern which becomes the electrodes 21, 22, and 24, the green sheet on which the electrode pattern is formed is laminated, and a laminated compact is produced by pressing using a press apparatus. Afterwards, the laminated compact is degreased and fired, and then cut into a predetermined dimension, thereby obtaining a laminate. Next, after the conductor paste for forming the electrodes 23 and 25, the first terminal electrode 41, the second terminal electrode 42, and the third terminal electrode (not shown) is printed and a resultant is baked at a predetermined temperature, a direct voltage is applied through the first to the third terminal electrodes and the polarization of the piezoelectric body layer 27 is performed. In doing so, it is possible to obtain the vibrating element 14. In addition, it is possible to use, for example, various kinds of well-known adhesive agents for joining between the vibrating element 14 and the cover body 11.

Moreover, in this example, a case where the vibrating element 14 is a bimorph type piezoelectric element in which the bending vibration is performed when the electric signal is input, is shown, however, the vibrating element 14 is not limited thereto, and the vibrating element 14 may be a vibrating element with a unimorph structure which is configured by sticking a piezoelectric element in which the stretching vibration is performed and a plate made of a metal or the like. In addition, the vibrating element 14 may be a vibrating element configured of only piezoelectric element in which the stretching vibration is performed in a direction which is parallel to the face attached to the cover body. The vibrating element 14 may have a function of vibrating the cover body 11 by vibration of the vibrating element itself when the electric signal is received, and therefore the vibrating element 14 is not limited to the piezoelectric element and it is possible to suitably use various kinds of well-known vibrating elements with this function. The vibrating element 14 may be, for example, an electrodynamic type vibrating element, an electrostatic type vibrating element, and an electromagnetic type vibrating element which are well known as a vibrating element that vibrates a speaker. Moreover, the electrodynamic type vibrating element is such a vibrating element so as to vibrate a coil by flowing a current to a coil arranged between magnetic poles of a permanent magnet, an electrostatic type vibrating element is such a vibrating element so as to vibrate metal plates by flowing a bias and an electric signal to two metal plates which are faced each other, and an electromagnetic type vibrating element is such a vibrating element so as to vibrate a thin iron plate by flowing an electric signal to a coil. For example, in a case of conductivity type, one of the permanent magnet and the coil may be fixed to the cover body 11, in a case of electrostatic type, one of two metal plates may be fixed to the cover body 11, and in a case of electromagnetic type, one of the coil or the iron plate may be fixed to the cover body 11.

In addition, the connector 12 is attached onto the surface inside the fourth portion 11d of the cover body 11, which is adjacent to the vibrating element 14. The connector 12 is connected to the vibrating element 14 by wiring (not shown). Then, the connector 12 has a function of connecting the vibrating element 14 to the mobile electronic device such that transmission of the electric signal is possible when the cover for a mobile electronic device is attached to the mobile electronic device. In FIG. 2, a case where the connector 12 is a plug type connector is shown, however, the connector 12 may have a function of connecting the vibrating element 14 to the mobile electronic device such that transmission of the electric signal is possible and various kinds of other connectors can be used. In some cases, the connector may be a mere metal plate.

Figure 6:
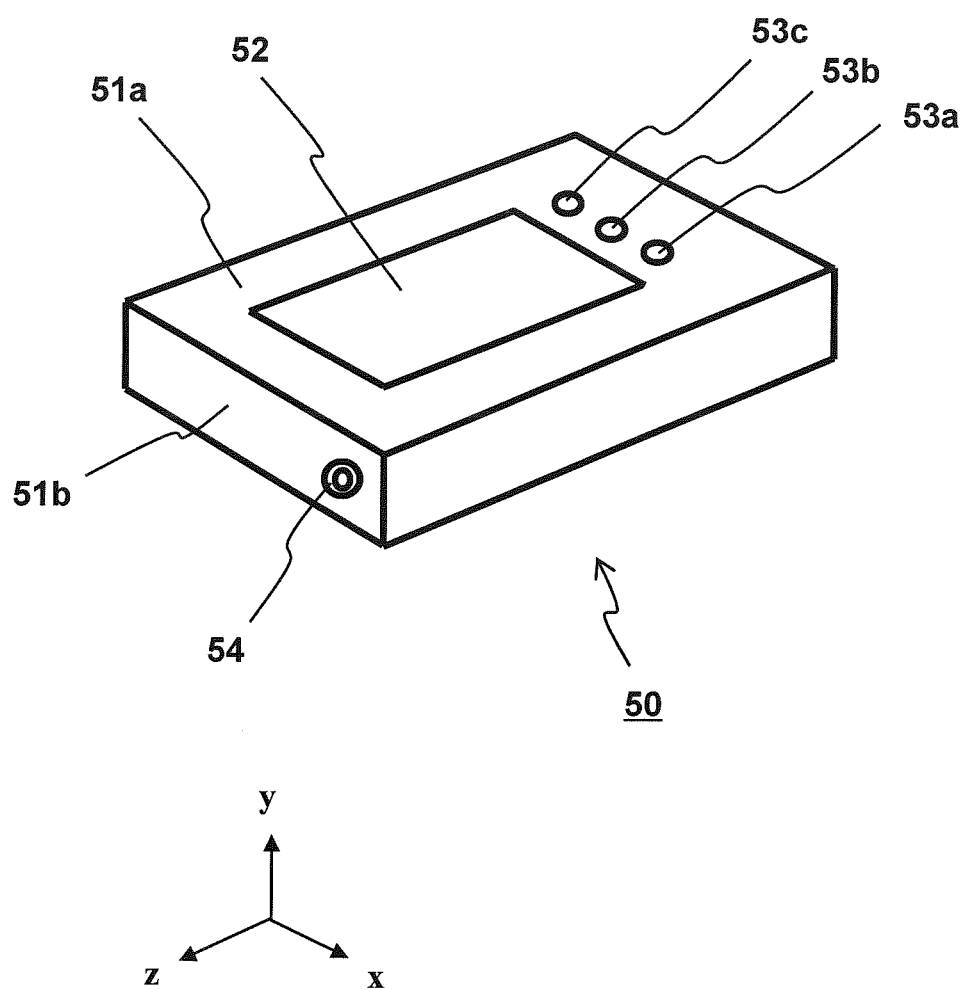
FIG. 6 is a perspective view schematically showing an example of a mobile electronic device attaching a cover for a mobile electronic device shown in FIG. 1.

FIG. 6 is a perspective view schematically showing an example of a mobile electronic device attaching a cover for a mobile electronic device shown in FIG. 1. A mobile electronic device 50 has a rectangular parallelepiped-like shape and has a plurality of surfaces (6). A display 52, operation buttons 53a, 53b, and 53c, and a connector 54 are exposed on the surface of the mobile electronic device 50. The connector 54 is a jack type connector, and more specifically an earphone jack. However, the connector 54 does not necessarily need to be an earphone jack and does not need to be a jack type connector. The connector 54 may be any connectors as long as the connector 54 has a function of electrically connecting the connector 12 of the cover for a mobile electronic device and the mobile electronic device 50. In addition, the mobile electronic device 50 is provided with a function of treating voice information, a function of treating video information, a communication function, or the like. Moreover, the mobile electronic device 50 may include at least a function of treating sound information and may not include a function of treating video information or a communication function. In addition, the mobile electronic device 50 may have another shape and, for example, the mobile electronic device 50 may have such a shape so as to have two surfaces which are one plane surface and one curved surface.

Figure 7:
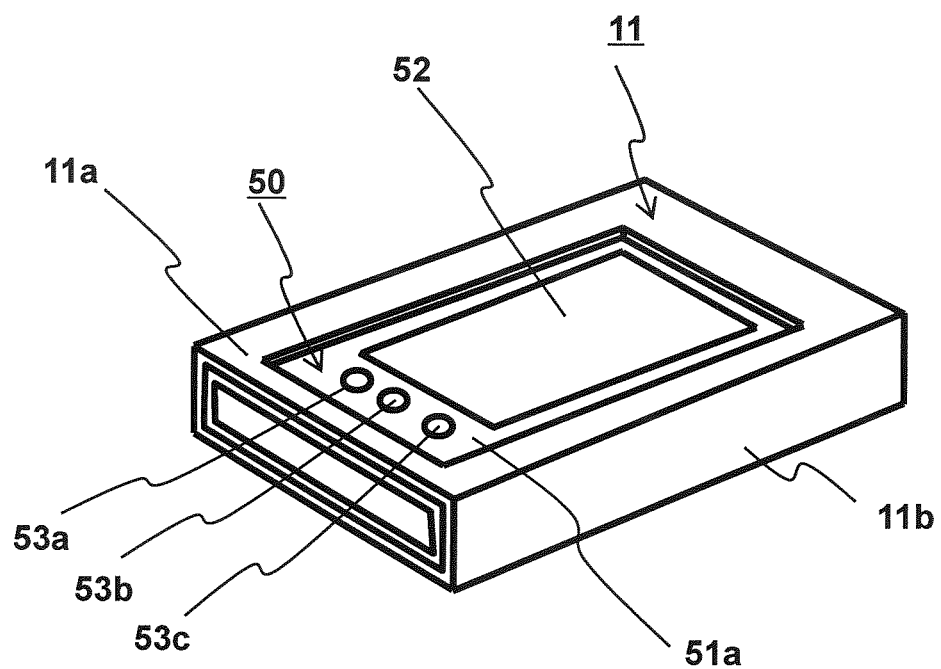
FIG. 7 is a perspective view schematically showing a state in which a mobile electronic apparatus of an example of an embodiment of the present invention is configured by attaching a cover for a mobile electronic device shown in FIG. 1 to a mobile electronic device.
Figure 8:
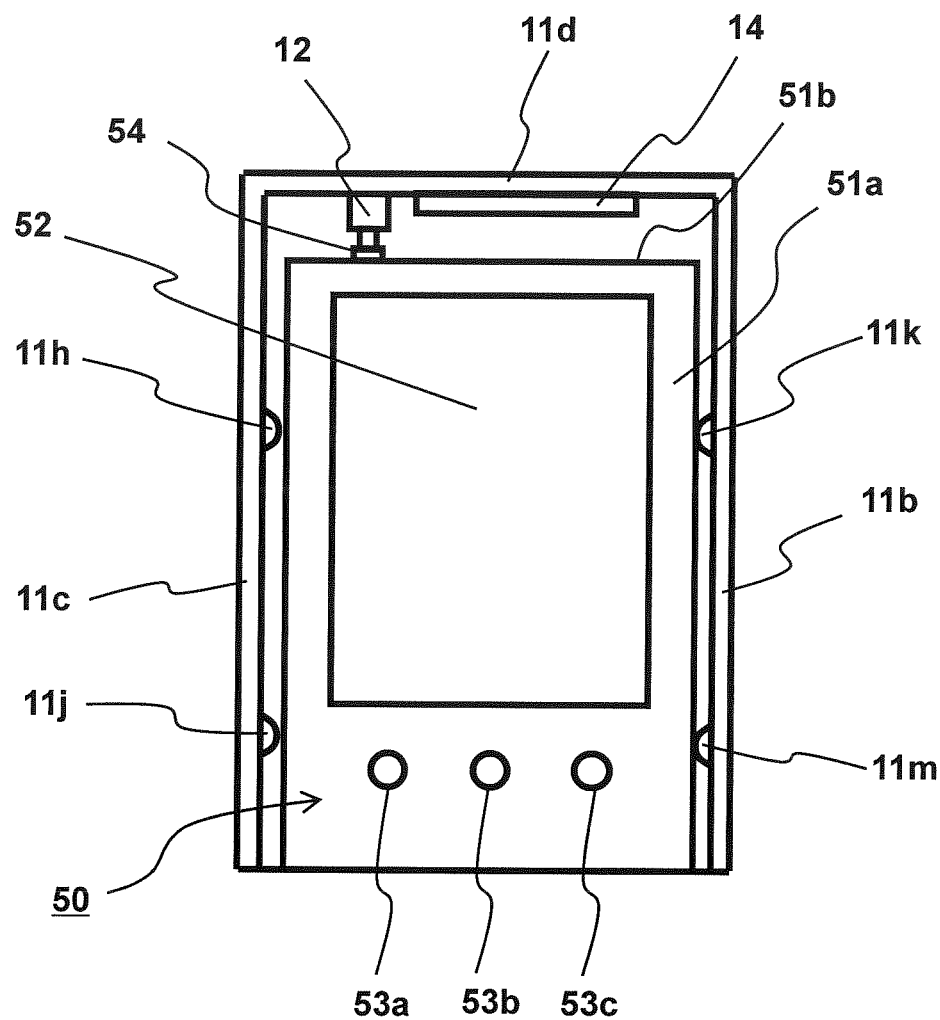
FIG. 8 is a plan view schematically showing a state in which a mobile electronic apparatus of an example of an embodiment of the present invention is configured by attaching a cover for a mobile electronic device shown in FIG. 1 to a mobile electronic device.

FIG. 7 is a perspective view schematically showing a state in which a mobile electronic apparatus of an example of an embodiment of the present invention is configured by attaching a cover for a mobile electronic device shown in FIG. 1 to a mobile electronic device 50. FIG. 8 is a plan view schematically showing a state in which a mobile electronic apparatus of an example of an embodiment of the present invention is configured by attaching a cover for a mobile electronic device shown in FIG. 1 to a mobile electronic device 50. Moreover, in order to make a structure easier to understand, a state in which a first portion 11a of a cover body 11 is seen through is shown in FIG. 8. In addition, an illustration of a detailed structure of the vibrating element 14 is omitted in FIG. 8.

The cover body 11 is attached to the mobile electronic device 50 so as to accommodate the mobile electronic device 50 therein. Then, four surfaces of the mobile electronic device 50 are completely covered with the second portion 11b, the third portion 11c, the fourth portion 11d, and the fifth portion 11e and a part of one surface 51a of the mobile electronic device 50 is covered with the first portion 11a. The display 52 and the operation buttons 53a, 53b, and 53c of the mobile electronic device 50 are exposed from a through hole 11f formed at the first portion 11a. In this manner, the cover body 11 is attached to the mobile electronic device with a plurality of surfaces and at least partially covers two or more of a plurality of surfaces. Moreover, the term "cover" also includes a case of covering at intervals in this manner.

In addition, only spacers 11h, 11j, 11k, 11m, 11p, and 11s, spacer (not shown) arranged inside the first portion 11a, and connector 12 are brought into contact with the mobile electronic device 50 and other portions of the cover for a mobile electronic device are not brought into contact with the mobile electronic device 50. That is, a gap is formed between the third portion 11c and the mobile electronic device 50 by the spacers 11h and 11j, a gap is formed between the second portion 11b and the mobile electronic device 50 by the spacers 11k and 11m, a gap is formed between the fifth portion 11e and the mobile electronic device 50 by the spacers 11p and 11s, a gap is formed between the first portion 11a and the mobile electronic device 50 by the spacer (not shown) arranged inside the first portion 11a, and a gap is formed between the fourth portion 11d and the mobile electronic device 50 by the connector 12. Therefore, the connector 12 is one of the spacers.

In addition, a part of the connector 12 is inserted into the connector 54 of the mobile electronic device 50 to be connected, and thereby, the vibrating element 14 and the mobile electronic device 50 are connected such that transmission of the electric signal is possible. In doing so, the cover for a mobile electronic device is attached to the mobile electronic device 50 and the mobile electronic apparatus in which the cover for a mobile electronic device is integrated with the mobile electronic device 50 is configured. That is, the mobile electronic apparatus of this example includes the cover for a mobile electronic device and the mobile electronic device 50 to which the cover for a mobile electronic device is attached.

Since the cover for a mobile electronic device of this example includes the cover body 11 which at least partially covers two or more of a plurality of surfaces of the mobile electronic device 50, it is possible to protect the surface of the mobile electronic device 50 and prevent the breakage of mobile electronic device 50.

In addition, since the cover for a mobile electronic device of this example has a shape such that the cover body 11 wholly covers two or more of a plurality of surfaces of the mobile electronic device, it is possible to enhance a function of protecting the mobile electronic device. In addition, since the cover for a mobile electronic device of this example has a shape such that the cover body 11 wholly covers the surface other than two surfaces including one surface which is the face with the biggest area among a plurality of surfaces of the mobile electronic device, it is possible to further enhance a function of protecting the mobile electronic device.

In addition, since the cover for a mobile electronic device of this example is attached to the cover body 11 and includes the vibrating element 14 that vibrates the cover body 11 by vibration thereof upon receiving the electric signal and the connector 12 for connecting the vibrating element 14 to the mobile electronic device 50 such that transmission of the electric signal is possible, it is possible to vibrate the cover body 11 in response to the electric signal input from the mobile electronic device 50 to generate a sound owing to vibration of the cover body 11 or to transmit information to a human by the cover body 11 which is vibrating being brought into contact with a human body, or the like. In a case where the electric signal of voice information is input from the mobile electronic device 50, it is possible to transmit voice information to a human by vibrating the cover body 11 in response to voice information.

In addition, the cover for a mobile electronic device of this example transmits information by vibrating the cover body 11, however, since the cover body 11 is located at the outermost part and it is easy to ensure a large surface area, it is possible to generate a big sound by vibrating the cover body 11. In addition, since the cover body 11 does not need the same level of strength as that of a housing of the mobile electronic device 50 and ones attached to the cover body 11 are only vibrating element 14, connector 12, or the like, the degree of freedom in quality of material or shape is large, and it is possible to generate high-quality vibration and sound due to these designs.

In addition, the mass of the cover for a mobile electronic device of this example without the vibrating element 14 is smaller than the mass of the mobile electronic device 50 and the cover for a mobile electronic device includes the spacer which forms a gap between the cover body 11 and the mobile electronic device 50 when the cover body 11 is attached to the mobile electronic device 50. Therefore, it is possible to generate strong vibration with less energy, compared to a case where the vibrating element is attached to the mobile electronic device 50 to vibrate the mobile electronic device 50 itself, and thus it is possible to reduce the power consumption of the mobile electronic device 50.

In addition, as to the cover for a mobile electronic device of this example, since the cover body 11 at least partially covers two or more of a plurality of surfaces of the mobile electronic device 50, it is possible to vibrate a plurality of surfaces at the same time and it is possible to arbitrarily select the position of vibrating according to the shape and the arrangement of the cover body 11.

In addition, as to the cover for a mobile electronic device of this example, the vibrating element 14 is attached at the position located between the cover body 11 and the mobile electronic device 50 when the cover body 11 is attached to the mobile electronic device 50. Thereby, since it is possible to protect the vibrating element 14 by the cover body 11, it is possible to reduce the occurrence of breakage of the vibrating element 14.

In addition, as to the cover for a mobile electronic device of this example, the vibrating element 14 is attached at the position located between a face 51b which is a surface other than a face with the largest area (51a and the face which faces 51a) among a plurality of surfaces of the mobile electronic device 50 and the cover body when the cover body 11 is attached to the mobile electronic device 50. Therefore, when the surface outside the portion (the fourth portion 11d) to which the vibrating element 14 of the cover body 11 is attached is brought into contact with a human body to transmit vibration, it is possible to decrease the area of the face which is brought into contact with a human body. Thereby, it becomes easy to apply strong pressure to the portion which is brought into contact with a human body and it is possible to reduce a loss of vibration energy due to the vibrating portion being brought into contact with a human body. Thereby, it is possible to reduce the power consumption of the mobile electronic device 50.

In addition, as to the cover for a mobile electronic device of this example, the vibrating element 14 is attached at the position located between a face 51*b* with the smallest area among a plurality of surfaces of the mobile electronic device 50 and the cover body 11 when the cover body 11 is attached to the mobile electronic device 50. Therefore, when the surface outside the portion (the fourth portion 11*d*) to which the vibrating element 14 of the cover body 11 is attached is brought into contact with a human body to transmit vibration, it is possible to decrease the area of the face which is brought into contact with a human body. Thereby, it becomes easy to apply strong pressure to the portion which is brought into contact with a human body and it is possible to reduce a loss of vibration energy owing to the vibrating portion being brought into contact with a human body. Thereby, it is possible to further reduce the power consumption of the mobile electronic device 50.

Moreover, a case where only spacer (including the connector 12) is brought into contact with the mobile electronic device 50 and a gap between the entire portions of the cover body 11 (11*a* to 11*e*) and the mobile electronic device 50 exists is shown, however, the cover for a mobile electronic device of this example is not limited thereto. For example, a gap only between the portion (the fourth portion 11*d*) to which the vibrating element 14 of the cover body 11 is attached and the mobile electronic device 50 may also be formed. In this case, only connector 12 may also be used as a spacer. In addition, in a case where the large energy may be used for the occurrence of vibration, the cover body 11 may not have the spacer.

In addition, in the cover for a mobile electronic device of this example, the connector 12 is connected to the earphone jack (the connector 54) of the mobile electronic device 50. Since many mobile electronic devices are provided with an earphone jack, the cover for a mobile electronic device of this example can be easily connected to many mobile electronic devices.

In addition, as to the mobile electronic apparatus of this example, since the cover for a mobile electronic device with the functions described above is attached to the mobile electronic device 50, it is possible to reduce the breakage of the mobile electronic device 50 and it is possible to transmit information by vibration. In addition, the mobile electronic apparatus of this example easily generates a big sound and also easily generates high-quality vibration and sound. In addition, as to the mobile electronic apparatus of this example, it is possible to vibrate a plurality of faces of the surface at the same time and it is possible to selectively vibrate the arbitrary portion (face) of the surface. In addition, as to the mobile electronic apparatus of this example, it is possible to generate strong vibration with less energy and it is possible to decrease the power consumption.

REFERENCE SIGNS LIST

11: cover body
11*h*, 11*j*, 11*k*, 11*m*, 11*p*, 11*s*: spacer
12: connector
14: vibrating element
50: mobile electronic device

The invention claimed is:

1. A cover for mobile electronic device, comprising:
a cover body that includes at least a part formed of an elastic body capable of transmitting vibration, that is attached to a mobile electronic device with a plurality of surfaces and that covers two or more of the plurality of surfaces;
a vibrating element that is attached to the cover body and that vibrates the cover body by vibration thereof upon receiving an electrical signal; and
a connector that is connected to the mobile electronic device so as to transmit the electrical signal to the vibrating element,
wherein voice information is transmitted by vibrating the cover body in response to the voice information upon receiving the electrical signal of the voice information from the mobile electronic device.

2. The cover according to claim 1,
wherein the cover body is to accommodate the mobile electronic device therein.

3. The cover according to claim 1,
wherein the vibrating element is located between the cover body and the mobile electronic device when the cover body is attached to the mobile electronic device.

4. The cover according to claim 3,
wherein the vibrating element is located between a face other than a face with the largest area among the plurality of surfaces of the mobile electronic device and the cover body when the cover body is attached to the mobile electronic device.

5. The cover according to claim 4,
wherein the vibrating element is located between a face with the smallest area among the plurality of surfaces of the mobile electronic device and the cover body when the cover body is attached to the mobile electronic device.

6. The cover according to claim 1, further comprising:
a spacer which forms a gap between the cover body and the mobile electronic device when the cover body is attached to the mobile electronic device,
wherein a mass without the vibrating element is smaller than a mass of the mobile electronic device.

7. A mobile electronic apparatus comprising:
the cover according to claim 6; and
the mobile electronic device to which the cover is attached,
wherein the cover body is attached to the mobile electronic device with a gap therebetween.

8. The cover according to claim 1,
wherein the connector is connected to an earphone jack of the mobile electronic device.

9. A mobile electronic apparatus comprising:
the cover according to claim 1; and
the mobile electronic device to which the cover is attached.

10. A cover for a mobile electronic device, comprising:
a cover body that is attached to a mobile electronic device;
a vibrating element that is attached to the cover body; and
a connector that is connected to the mobile electronic device,
wherein voice information is transmitted by vibrating the cover body in response to the voice information upon receiving the electrical signal of the voice information from the mobile electronic device.

11. The cover according to claim 10,
wherein the cover body is to accommodate the mobile electronic device therein.

12. The cover according to claim 10,
wherein the vibrating element is located between the cover body and the mobile electronic device when the cover body is attached to the mobile electronic device.

13. The cover according to claim 12,
wherein the vibrating element is located between a face other than a face with the largest area among a plurality of surfaces of the mobile electronic device and the cover body when the cover body is attached to the mobile electronic device.

14. The cover according to claim 13,
wherein the vibrating element is located between a face with the smallest area among the plurality of surfaces of the mobile electronic device and the cover body when the cover body is attached to the mobile electronic device.

15. The cover according to claim 10, further comprising:
a spacer which forms a gap between the cover body and the mobile electronic device when the cover body is attached to the mobile electronic device,
wherein a mass without the vibrating element is smaller than a mass of the mobile electronic device.

16. A mobile electronic apparatus comprising:
the cover according to claim 15; and
the mobile electronic device to which the cover is attached,
wherein the cover body is attached to the mobile electronic device with a gap therebetween.

17. The cover according to claim 10,
wherein the connector is connected to an earphone jack of the mobile electronic device.

18. A mobile electronic apparatus comprising:
the cover according to claim 10; and
the mobile electronic device to which the cover is attached.

\* \* \* \* \*